United States Patent [19]

Elkins

[11] Patent Number: 4,848,134

[45] Date of Patent: Jul. 18, 1989

[54] VEHICLE ACCELERATION APPARATUS

[76] Inventor: Jack D. Elkins, Rte. 2, Box 272, Kingston, Tenn. 37763

[21] Appl. No.: 72,128

[22] Filed: Jul. 10, 1987

[51] Int. Cl.$^4$ ............................................. G01N 3/08
[52] U.S. Cl. ........................................ 73/12; 185/33
[58] Field of Search .................. 73/12; 185/4, 27, 32, 185/33; 254/264

[56] References Cited

U.S. PATENT DOCUMENTS 971,482  9/1910  Anthony .............................. 185/32

OTHER PUBLICATIONS

Aston, T. R., Impact Testing of Motor Vehicles, from Elec. and Electron. Tech. Eng. (G.B.) Vol. 6, No. 4, Jan. 1972, pp. 3–7.

Primary Examiner—Jerry W. Myracle
Attorney, Agent, or Firm—Pitts & Brittian

[57] ABSTRACT

A vehicle acceleration apparatus (10) for accelerating a vehicle (36) having a preselected mass to a preselected velocity. The apparatus (10) comprises a support structure, including a sheave (14) rotatably mounted on a frame (16), which supports a mass member or weight (12) having a preselected mass, such that the weight (12) is positioned for reciprocal vertical movement. More specifically, the weight (12) is supported such that it can be selectively allowed to fall in response to gravity and selectively returned to a pre-fall position. The apparatus (10) further comprises elements for connecting the weight (12) to the vehicle (36) to be accelerated such that the downward acceleration of the weight (12) as it falls causes selected acceleration of the vehicle (36). In operation, the relative mass of the vehicle (36) and weight (12) is selected such that the vehicle will be accelerated by the downward acceleration of the weight (12) to have a preselected velocity at a preselected location.

9 Claims, 4 Drawing Sheets

VEHICLE ACCELERATION APPARATUS

DESCRIPTION

1. Technical Field

This invention relates to a vehicle acceleration apparatus for accelerating a vehicle to a preselected velocity. In this particular invention the apparatus comprises a mass member or weight supported by a support structure for reciprocal vertical movement and means for connecting the weight to the vehicle to be tested.

2. Background Art

In order to perform impact testing of vehicles and vehicle barriers, various devices and apparatuses have been devised to accelerate the test vehicle to the desired impact velocity. Conventional acceleration means have employed engines within the test vehicle; secondary engines, usually in the form of expendable solid fuel rockets; inclined tracks or cableways; pushing or towing by other vehicles and various other propulsion means. However, such conventional means tend to be ineffective in bringing the vehicles to the precise velocity desired, or are complex and expensive to construct and operate. For example, where the system employs an engine within the test vehicle, test vehicles tend to be expensive and the engine is often destroyed during the impact testing. Similarly, expendable solid fuel rockets tend to be expensive, and inclined tracks and cableways are generally expensive to construct and maintain.

Therefore, it is an object of the present invention to provide a vehicle acceleration apparatus for accelerating a moveable vehicle to a preselected velocity.

It is a further object of the present invention to provide a vehicle acceleration apparatus which does not require test vehicles to incorporate engines or other propulsion means.

A further object of the present invention is to provide a vehicle acceleration apparatus that is inexpensive to manufacture and maintain.

DISCLOSURE OF THE INVENTION

Other objects and advantages will be accomplished by the present invention which provides a vehicle acceleration apparatus for accelerating a vehicle having a preselected mass to a preselected velocity. The acceleration apparatus comprises a support structure which supports a mass member or weight having a preselected mass such that the weight is positioned for reciprocal vertical movement. More specifically, the weight is supported such that it can be selectively allowed to fall in response to gravity and returned to a pre-fall position as desired. The apparatus further comprises means for connecting the weight to the vehicle to be accelerated such that the downward acceleration of the weight causes selected acceleration of the vehicle. In operating the apparatus, the relative mass of the vehicle and weight is selected such that the vehicle will be accelerated by the downward acceleration of the weight so as to have a preselected velocity at a preselected location.

BRIEF DESCRIPTION OF THE DRAWINGS

The above-mentioned features of the present invention will become more clearly understood from the following detailed description of the invention read together with the drawings in which.

BEST MODE FOR CARRYING OUT THE INVENTION

A vehicle acceleration apparatus incorporating various features of the present invention is illustrated at 10 in the figures. The apparatus 10 is utilized to accelerate a vehicle, such as a car or truck, having a preselected mass to a preselected velocity. As will become clear from the discussion which follows, the apparatus 10 can be utilized to accelerate a test vehicle toward a barrier to test the ability of the vehicle to withstand crashes at selected velocities, or to test the ability of the barrier to withstand the impact of a moving vehicle. However, it will be understood that the apparatus can be used for various applications where it is necessary to accelerate a vehicle such that the vehicle reaches a preselected velocity at a preselected location.

Figure 1:
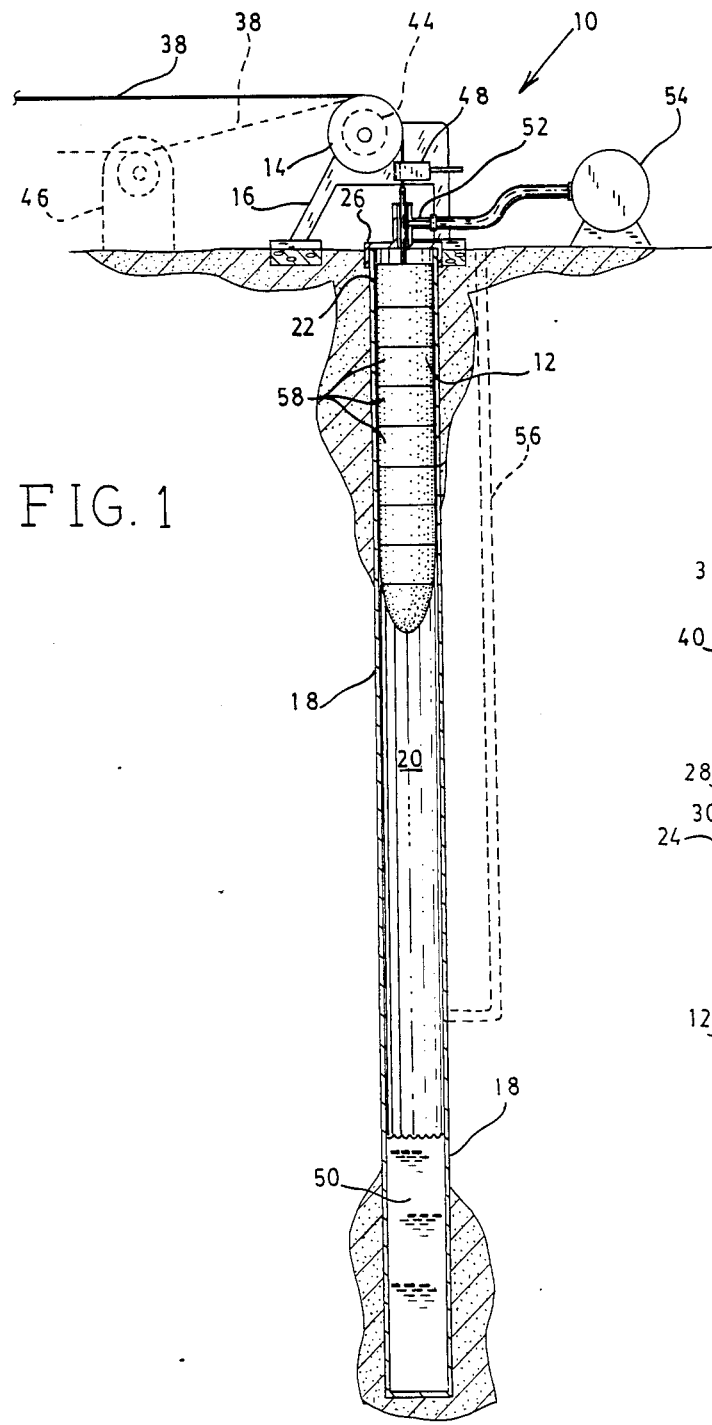
FIG. 1 illustrates a side elevation view, in section, of a vehicle acceleration apparatus of the present invention.

Referring now to FIG. 1, the vehicle acceleration apparatus 10 comprises a support structure which supports a mass member or weight 12 such that the weight 12 is positioned for reciprocal vertical movement. More specifically, in the preferred embodiment, the support structure includes a sheave 14 rotatably mounted on a suitable frame 16. Also included in the preferred embodiment is a vertically disposed elongated casing 18 defining an interior passageway 20 which closely receives the weight 12. As illustrated, the casing 18 is preferably buried in the ground such that the upper end portion 22 of the casing 18 is disposed proximate ground level. Further, the upper end portion 22 of the casing 18 defines an opening 24 which accesses the passageway 20, as is provided with a cap member 26 for selectively losing the opening 24. Of course, it will be appreciated that because the casing is buried it is desirable that the casing 18 be substantially fluid impervious such that ground water does not seep into the passageway 20.

Figure 2:
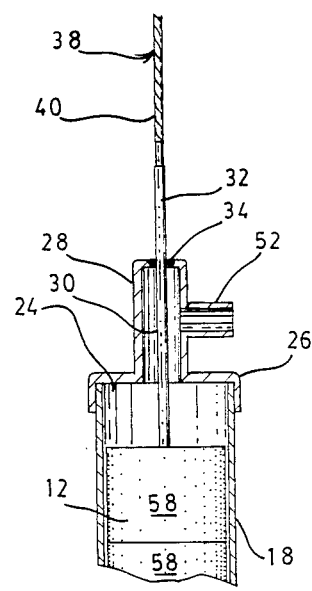
FIG. 2 illustrates a side elevation view, in section, of a portion of the casing and weight of a vehicle acceleration apparatus of the present invention.

In the preferred embodiment, the cap member 26 is provided with an axially oriented, vertically disposed, sleeve 28 defining a passageway 30 therethrough. The passageway 30 is slidably receptive of a shaft 32, the shaft 32 being secured at its lower end to the weight 12. Thus, as illustrated in FIG. 2, when the weight 12 is in a fully raised position within the casing 18, the shaft 32 extends through, and out of, the sleeve 28. Further, a seal member 34 is provided between the walls of the passageway 30 and the shaft 32 to facilitate the substantially fluid impervious sealing of the casing 18.

The vehicle acceleration apparatus 10 further comprises means for connecting the weight 12 to the vehicle 36 which is to be accelerated. In the preferred embodiment, the means for connecting the weight 12 to the vehicle 36 includes a cable 38 having a first end portion 40 which engages the shaft 32 of the weight 12, and a second end portion 42 which releasably engages the vehicle 36 (see FIG. 3). As illustrated in FIG. 1, the cable 38 is rotatably received by the sheave 14, with the sheave 14 being disposed above the opening 24 such that as the cable 38 passes over the sheave 14 and downwardly to engage the weight 12, the cable 38 is substantially axially aligned with respect, to the passageway 20. Thus, with the cable 38 axially engaging the weight 12, the weight 12 can be selectively raised and lowered within the passageway 20 by manipulating the cable 38. In this regard, means for raising the weight 12 are provided. Such means can comprise a winch for rotatably engaging the cable 38 and raising the weight, such as the illustrated winch 44 mounted on the frame 16 or an independently positioned winch such as the winch 46. Further, a suitable locking mechanism, such as the mechanism 48 is provided (see FIG. 1) for engaging the cable 38 and holding the weight 12 in a raised position within the casing 18.

In order to operate the apparatus 10, the means for raising the weight 12 is utilized to raise the weight 12 within the casing 18 to a pre-fall position proximate the upper end portion of the casing 18, and the second end portion 42 of the cable 38 is secured to the vehicle 36. When acceleration of the vehicle 36 is desired, the locking mechanism 48 is disengaged and gravity acting on the weight 12 causes the weight to fall within the casing 18, pulling the cable 38 and accelerating the vehicle 36. In order to absorb the shock of the falling weight 12, the lower portion of the casing 18 can be pre-filled with a liquid 50.

Further, in order to avoid interference with the free fall of the weight 12 due to a piston effect resulting from a pressure build-up within the casing below the falling weight 12, evacuation means can be provided for evacuating the passageway 20 just prior to release of the weight 12. In this regard, in the preferred embodiment of the apparatus 10, the sleeve 28 of the cap member 26 is provided with an evacuation port 52 communicating with the passageway 30 of the sleeve 28, the port 52 being connected in fluid communication with a suitable vacuum generating means 54. Thus, just prior to release of the weight 12, a vacuum can be applied to the port 52 evacuating the passageway 20 such that a piston effect is avoided. Alternatively, it will be noted that a venting conduit 56 can be provided for placing the lower portion of the passageway 20 in fluid communication with the above ground atmosphere, thereby ventilating the passageway and avoiding pressure build-up below the weight 12 as it falls.

It will be appreciated by those skilled in the art that by preselecting the relative mass of the weight 12 and the vehicle 36, the vehicle 36 can be accelerated such that the vehicle reaches a preselected velocity at a preselected location. Accordingly, by increasing the mass of the weight member 12 relative to the mass of the vehicle 36, the rate of acceleration of the vehicle 36 can be increased, and by decreasing the mass of the weight 12, the rate of acceleration of the vehicle can be decreased. Therefore, in the preferred embodiment, the weight 12 comprises a plurality of weight segments 58 releasably joined by suitable fastening means (not shown), such that the desired mass of the weight 12 can be selected by incorporating the appropriate number of weight segments 58. It will also be understood that by altering the distance of fall of a selected weight member 12, velocity of the vehicle 36 can be manipulated, with a greater distance of fall producing greater velocity of the vehicle 36. In order to vary the distance of fall of the weight 12, either the level of the liquid 50 can be altered, or the weight 12 can be only partially raised within the casing 18. In either event, the pre-fall distance between the weight 12 and the surface of the liquid 50 can be altered to preselect the distance of fall.

Figure 3:
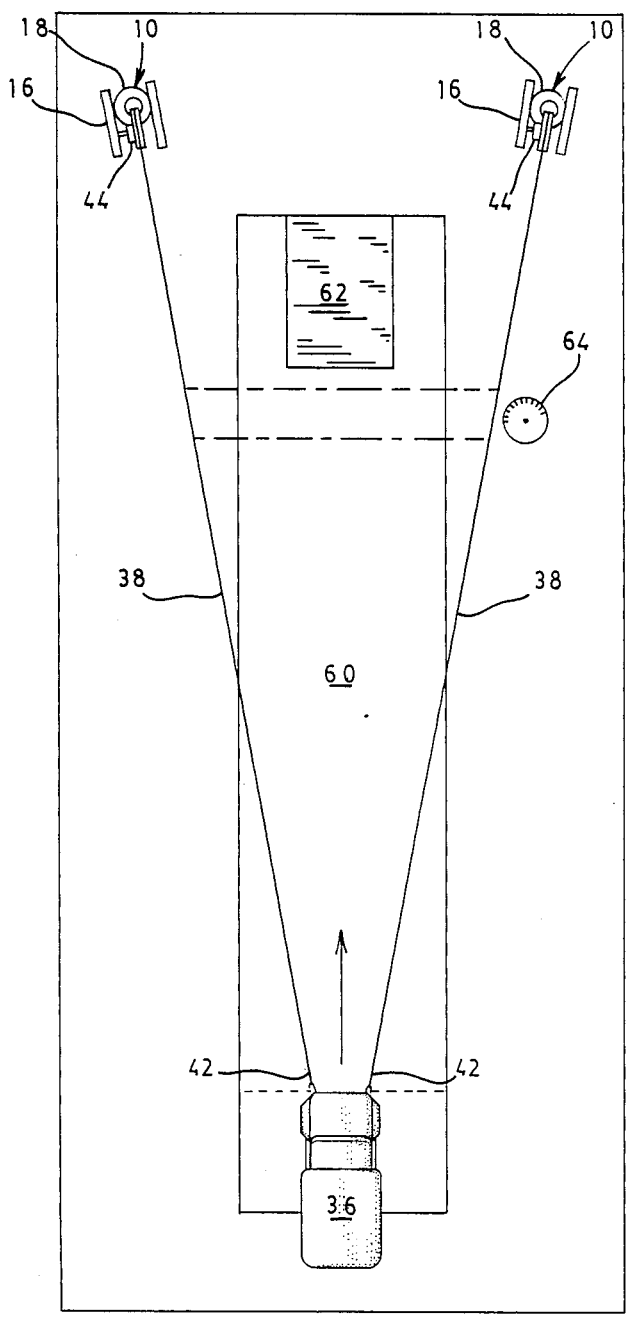
FIG. 3 is a diagrammatic top view of two vehicle acceleration apparatuses of the present invention as they engage a test vehicle.

As illustrated in FIG. 3, two of the vehicle acceleration apparatuses 10 can be utilized if desired. FIG. 3 illustrates an example of utilization of the apparatuses 10 in the crash testing of a vehicle 36. In this application of the apparatus, the vehicle 36 is positioned on a runway 60 and directed toward a barrier 62. The apparatuses 10 are positioned behind and equidistant to either side of the barrier 62. As described above, the weights 12 are raised to their pre-fall positions and the cables 38 are secured to the vehicle 36. When the weights are simultaneously released, the cables 38 pull the vehicle forward, accelerating the vehicle toward and into the barrier 62. Of course, velocity monitoring means can be provided to monitor the velocity of the vehicle 36 prior to impact as is diagrammatically illustrated at 64 in FIG. 3. Further, it will be appreciated that by positioning the apparatuses 10 on either side of the barrier 62, the desired direction of travel of the vehicle is maintained and the cables 38 pull the vehicle 36 into the barrier 62.

Figure 4:
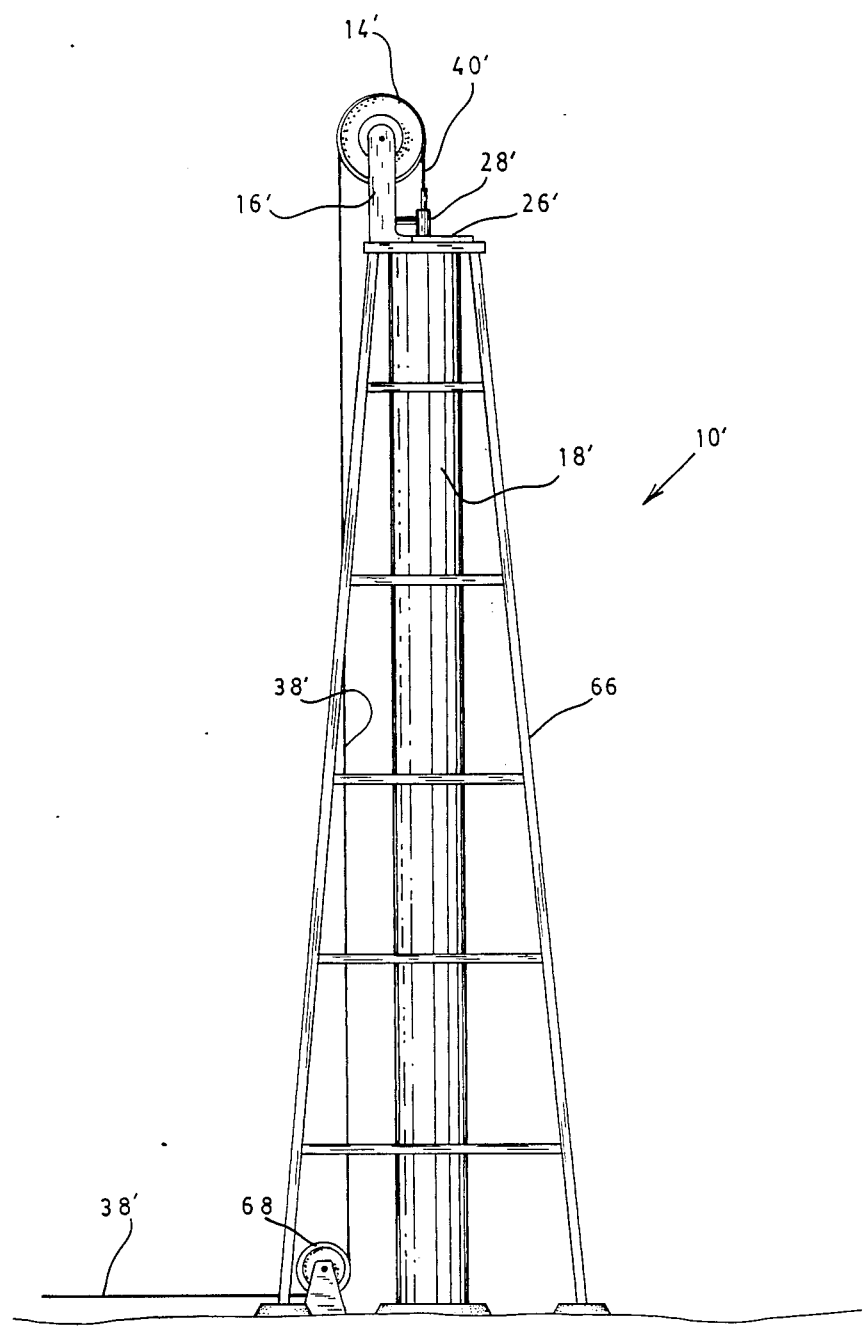
FIG. 4 is a side elevation view of an alternate embodiment of a vehicle acceleration apparatus of the present invention.

Referring now to FIG. 4, an alternate embodiment of the vehicle acceleration apparatus of the present invention is illustrated at 10'. (For convenience, features which the apparatus 10' has in common with the apparatus 10 are referenced by common prime numerals.) In the apparatus 10', the casing 18' is disposed above ground and the support structure includes a supporting frame 66 for holding the casing 18' in a vertical position. Further, a second sheave member 68 is rotatably mounted proximate the bottom portion of the frame 66 such that the cable 38' is received over the sheave 14' and runs downwardly to be received under the sheave member 68 and directed in substantially horizontal alignment to the vehicle 36. It will be appreciated that the apparatus 10' functions as described with respect to the apparatus 10, but does not require the burying of the casing 18'.

Figure 5:
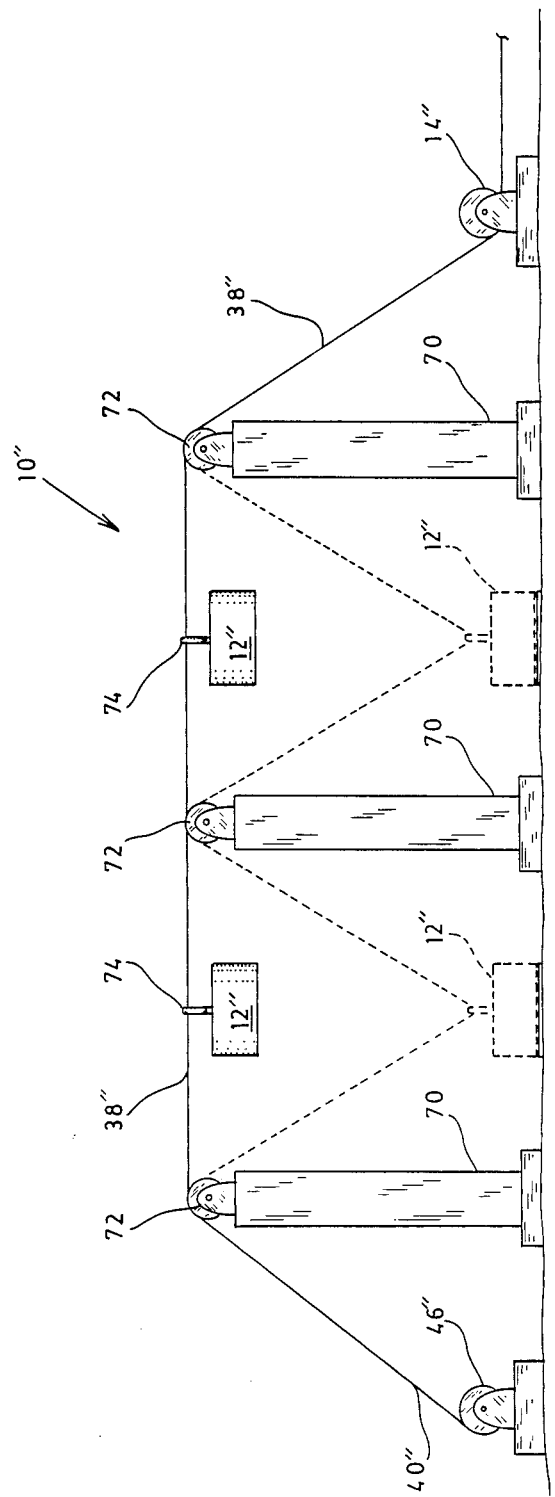
FIG. 5 is a side elevation view of an alternate embodiment of a vehicle acceleration apparatus of the present invention.

A further alternative embodiment of the vehicle acceleration apparatus of the present invention is illustrated at 10" in FIG. 5. In the apparatus 10", the support structure comprises a plurality of selectively spaced vertically disposed columns 70, each of which carries at its upper end a further sheave member 72. The first end portion 40" of the cable 38" is secured to a suitable anchoring means, which in the preferred embodiment comprises a winch 46", and the cable 38" is received by the sheave members 72 such that the columns 70 serve to support the cable 38" in an elevated position. Being thusly received over the sheaves 72, the cable 38" is routed under the sheave member 14", and the second end portion of the cable 38" attached to the vehicle to be accelerated. As will be discussed further below, the sheave member 14" is provided with a suitable locking mechanism (not shown) for engaging and holding the cable 38".

As illustrated, the weight members 12" are disposed between the columns 70 and slidably secured to the cable 38" with suitable engaging means 74. Thus, by engaging the locking mechanism of the sheave member 14" to secure the cable 38" and using the winch 46" to pull the cable 38" taut between the winch 46" and the sheave member 14", the weights 12" can be raised to a prefall position as indicated by the solid lines in FIG. 5.

In order to accelerate the vehicle, the locking mechanism of the sheave member 14" is released, allowing the weights 12" to fall to the postfall position, indicated by broken lines in FIG. 5, pulling the cable 38" downward. Of course, the routing of the cable 38" under the sheave 14" results in the downward pull on the cable 38" being communicated to the vehicle as horizontal pull and the vehicle is accelerated.

It should be noted that whereas the illustrated embodiment of the apparatus 10" has three columns 70, and two weights 12", other numbers of columns and weights can be used as required to produce the desired acceleration. Further, the winch 46" can be replaced with a simple anchoring means for securing the cable 38, and other suitable cable pulling means can be provided. For example, a winch could be incorporated into the sheave member 14" or provided between the sheave member 14" and the vehicle.

In light of the above, it will be appreciated that the vehicle acceleration apparatus of the present invention provides an efficient means for accelerating a vehicle to a preselected velocity for test purposes. The apparatus is inexpensive to construct and operate, particularly when compared to the complex prior art apparatuses heretofore utilized. Further, the vehicles being tested need not incorporate engines such that the cost of crash testing is greatly reduced.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. A vehicle acceleration apparatus for accelerating a vehicle having a preselected mass to a preselected velocity, said apparatus comprising:
    a support structure, including a vertically disposed elongated casing defining a passageway, said casing having an upper end portion defining an opening accessing said passageway, said support structure further including a sheave member rotatably mounted on a frame and disposed proximate said opening in said casing;
    a mass member having a preselected mass and being movably received within said passageway defined by said casing, whereby gravity acts upon said mass member causing said mass member to be downwardly accelerated from a pre-fall position;
    a cap member for being received over said opening in said upper portion of said casing, said cap member being provided with an axially oriented sleeve defining a passageway therethrough, said mass member being provided with an axially oriented shaft for being received through said passageway of said sleeve, said shaft having an outboard end portion;
    means for connecting said mass member to said vehicle whereby said downward acceleration of said mass member causes selected acceleration of said vehicle, last said means including a cable having a first end portion secured to said outboard end portion of said shaft member of said mass member and a second end portion for releasably engaging said vehicle, said cable being received by and over said sheave member; and
    whereby the relative mass of said vehicle and said mass member is selected such that said vehicle will be selectively accelerated by said downward acceleration of said mass member so as to have a preselected velocity at a preselected location.

2. The vehicle acceleration apparatus of claim 1 wherein said sleeve of said cap is provided with an annular seal member disposed within said passageway of said sleeve between said sleeve and said shaft of said mass member for facilitating the substantially fluid impervious sealing of said casing.

3. The vehicle acceleration apparatus of claim 2 wherein said sleeve of said cap member defines a vacuum port communicating with said passageway of said sleeve and said passageway of said casing and wherein said apparatus further comprises means for evacuating said passageway of said casing, said means including a vacuum generating means ofr being connected to said port.

4. The vehicle acceleration apparatus of claim 1 wherein a selected portion of said casing is disposed below ground level.

5. The vehicle acceleration apparatus of claim 1 wherein said lower end portion of said casing is filled with a liquid for decelerating said mass member and absorbing the shock associated therewith.

6. A vehicle acceleration apparatus for accelerating a vehicle having a preselected mass to a preselected velocity, said apparatus comprising:
    a support structure, including a vertically disposed elongated casing defining a passageway, said casing having an upper end portion defining an opening accessing said passageway, said support structure further including a sheave member rotatably mounted on a frame and disposed proximate said opening in said casing;
    a mass member having a preselected mass and being movably received within said passageway defined by said casing, whereby gravity acts upon said mass member causing said mass member to be downwardly accelerated from a pre-fall position;
    means for evacuating said passageway of said casing to facilitate the unrestricted fall of said mass member within said casing;
    means for connecting said mass member to said vehicle whereby said downward acceleration of said mass member causes selected acceleration of said vehicle, last said means including a cable having a first end portion secured to said mass member and a second end portion for releasably engaging said vehicle, said cable being received by and over said sheave member; and
    whereby the relative mass of said vehicle and said mass member is selected such that said vehicle will be selectively accelerated by said downward acceleration of said mass member so as to have a preselected velocity at a preselected location.

7. The vehicle acceleration apparatus of claim 6 wherein all but a selected portion of said casing proximate said upper end portion of said casing is disposed below ground level.

8. The vehicle acceleration apparatus of claim 6 wherein said lower end portion of said casing is filled with a liquid for decelerating said mass member and absorbing the shock associated therewith.

9. A vehicle acceleration apparatus for accelerating a vehicle having a preselected mass to a preselected velocity, said apparatus comprising:
    a support structure having a plurality of selectively spaced vertically disposed columns, each said column including an upper end portion carrying a first sheave member and cable anchoring means, and further including a second sheave member;

a mass member having preselected mass and being supported by said support structure for vertical movement, whereby gravity acts upon said mass member causing said mass member to be downwardly accelerated from a pre-fall position;

means for connecting said mass member to said vehicle whereby said downward acceleration of said mass member causes selected acceleration of said vehicle, last said means including a cable having a first and second end portion, said cable being secured at said first end portion to said anchoring means and routed over said first sheave members of said columns and under said second sheave member and releasably secured at said second end portion to said vehicle, said mass member being slidably mounted on said cable between said columns, and whereby the relative mass of said vehicle and said mass member is selected such that said vehicle will be selectively accelerated by said downward acceleration of said mass member so as to have a preselected velocity at a preselected location.

* * * * *